(12) United States Patent
Grant et al.

(10) Patent No.: US 7,798,311 B2
(45) Date of Patent: Sep. 21, 2010

(54) CONVEYOR

(76) Inventors: Daniel Grant, Adderley, Walpole Avenue, Chipstead, Surrey, CR5 3PR (GB); Douglas Grant, Adderley, Walpole Avenue, Chipstead, Surrey, CR5 3PR (GB)

( * ) Notice: Subject to any disclaimer, the term of this patent is extended or adjusted under 35 U.S.C. 154(b) by 94 days.

(21) Appl. No.: 11/667,539

(22) PCT Filed: Nov. 7, 2005

(86) PCT No.: PCT/GB2005/004293

§ 371 (c)(1),
(2), (4) Date: Aug. 20, 2007

(87) PCT Pub. No.: WO2006/051276

PCT Pub. Date: May 18, 2006

(65) Prior Publication Data

US 2008/0110729 A1 May 15, 2008

(30) Foreign Application Priority Data

Nov. 12, 2004 (GB) ................................ 0425019.7

(51) Int. Cl.
B65G 17/06 (2006.01)
B65G 17/00 (2006.01)
(52) U.S. Cl. .................................................. 198/502.1
(58) Field of Classification Search ............... 198/502.1
See application file for complete search history.

(56) References Cited

U.S. PATENT DOCUMENTS

| 4,613,942 A | * | 9/1986 | Chen ........................... 700/259 |
| 5,165,526 A | | 11/1992 | Conklin, Jr. ................. 198/804 |
| 5,176,239 A | | 1/1993 | Findlay et al. ............... 198/321 |
| 5,280,831 A | * | 1/1994 | Conklin, Jr. ............... 198/502.1 |
| 5,411,127 A | | 5/1995 | Findlay ....................... 198/333 |
| 5,439,090 A | | 8/1995 | Findlay ....................... 198/333 |
| 5,492,215 A | | 2/1996 | Affeldt et al. ............. 198/464.4 |
| 6,044,961 A | | 4/2000 | Hines |
| 6,186,314 B1 | | 2/2001 | Conklin, Jr. ............... 198/502.1 |
| 6,260,693 B1 | * | 7/2001 | Mohr .......................... 198/850 |
| 6,910,293 B1 | * | 6/2005 | Armstrong et al. ............ 40/524 |

FOREIGN PATENT DOCUMENTS

DE 199 12 383 A1 9/1999

OTHER PUBLICATIONS

International Search Report, Jan. 25, 2006.

* cited by examiner

*Primary Examiner*—Gene Crawford
*Assistant Examiner*—Kavel P Singh
(74) *Attorney, Agent, or Firm*—Woodard, Emhardt, Moriarty, McNett & Henry LLP

(57) ABSTRACT

A conveyor (2) which has a plurality of slats (6) for transferring articles around the conveyor (2), some or all of the slats (6) having at least one visible surface (14) through which indicia is displayed.

19 Claims, 3 Drawing Sheets

CONVEYOR

The present invention relates to conveyors, and in particular to a conveyor system that is designed to incorporate slats capable of displaying, for example, advertising material.

Reference herein to "conveyor" is used to describe any system that includes a moving platform for continuous transportation of articles or people. Although the specific embodiment of this application relates to an airport baggage carousel, it is appreciated that the system could be applied to other conveyor systems such as, for example, but not exclusively, airport check-ins, escalators, shop check outs.

For most travelers, part of the process of travelling by air includes collecting luggage from one of many luggage carousels located within an airport. This involves large numbers of travelers standing alongside one of several conveyor carousels waiting for their luggage to appear. The amount of luggage transported on a particular flight and common-place delays in processing the luggage often result in a traveler waiting alongside a carousel for a significant period of time.

Conventionally, the exposed surfaces of slots of a carousel are plain and carry no data of an informative or advertising nature.

The Applicant's earlier U.S. application Ser. No. 10/588,995, which is U.S. publication No. 2007/267272, discloses a slat for a conveyor system that has been designed to carry advertising.

The present application relates to conveyors that have been designed to incorporate such, slats, or slats of a similar nature.

In one embodiment, the present invention sets out to provide a conveyor system capable of incorporating slats that include the means to display advertising or other indicia, and means to communicate that indicia across the slats of the system.

According to a first aspect of the invention, there is provided a conveyor having a plurality of slats for transferring articles around the conveyor, some or all of the slats having at least one visual surface through which indicia is displayed.

According to a second aspect of the invention, there is provided a conveyor having a plurality of slats for transferring articles around the conveyor, some or all of the slats having at least one visual surface through which computer-generated indicia is displayed, at least one slat being in communication with at least one other slat to control the indicia displayed through each slat.

Preferably, the slats have a retaining surface for retaining items thereon and a visual surface, the slats being incorporated into the conveyor adjacent to each other such that the retaining surfaces and the visual surfaces extend in continuity along at least part of the length of the conveyor.

Preferably at least one slat incorporates a power source.

Preferably the power source is located behind the retaining surface of the slat.

Preferably, the slats are in communication with each other to transfer the power to each slat.

Preferably at least one slat comprises a communication port to receive data from a central control. Preferably still, the central control is remote from the conveyor.

Preferably, the slats are in communication with each other to transfer the data to each slat.

The invention will now be described by way of example with reference to the accompanying diagrammatic drawings, in which.

Figure 1:
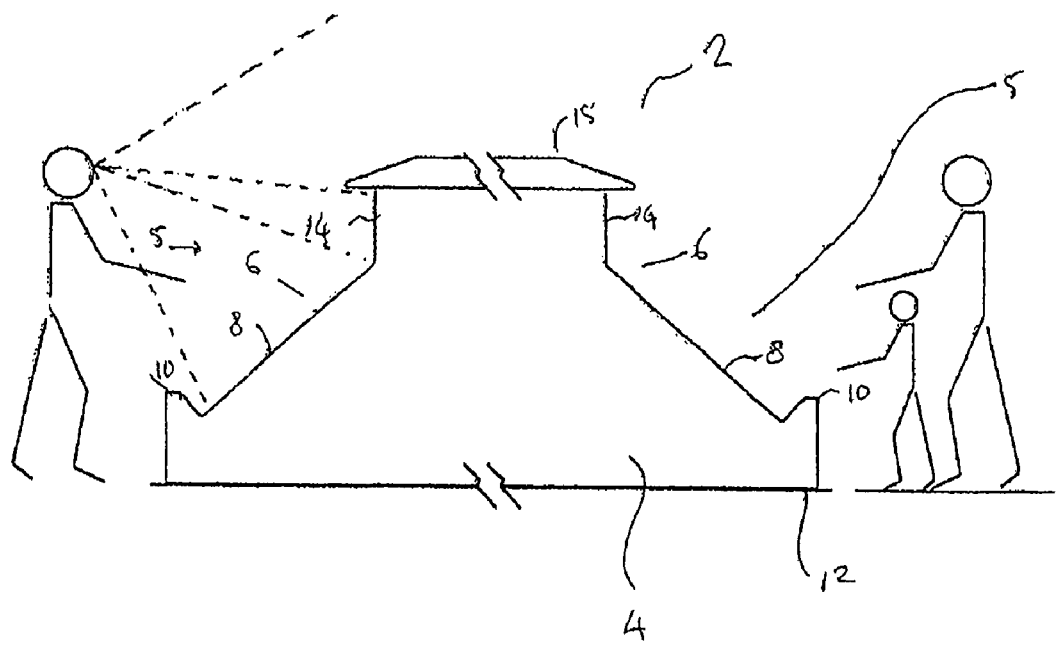
FIG. 1 is a side view in section of part of a conveyor constructed in accordance with the present invention.

With reference first to FIG. 1, the invention provides a conveyor 2 for use as inter alia an airport baggage carousel. The conveyor 2 comprises a main housing 4 formed as continuous length. The sides 5 of the conveyor are constructed of a plurality of slats 6 which extend at least partially along all sides of the housing 4. Each slat 6 has a baggage retaining surface 8 formed substantially in a mid-portion thereof to the extent that, once the slats 6 are incorporated, the conveyor 2 has a continuous baggage retaining surface 8 extending along all sides 5. Each slat 6 is incorporated into the main housing 4 of the conveyor 2 in such a way that the baggage retaining surface 8 of each slat 6 is provided at an angle, typically of around 45 degrees to the horizontal. An angled step 10 is formed at the base 12 of the conveyor housing 4 which acts as a baggage stop to prevent the baggage from sliding from the slatted surface 8 and off the conveyor 2.

Each slat 6 has a second visual surface 14 formed substantially in an upper portion thereof to the extent that, once the slats 6 are incorporated, the conveyor 2 has a continuous visual surface 14 extending along all sides 5, above the baggage retaining surface 8.

The visual surface 14 of each slat 6 is formed at an angle to the baggage retaining surface 8 such that, when the slats 6 are incorporated into the conveyor housing 4, the visual surface 14 is substantially vertical.

Figure 2:
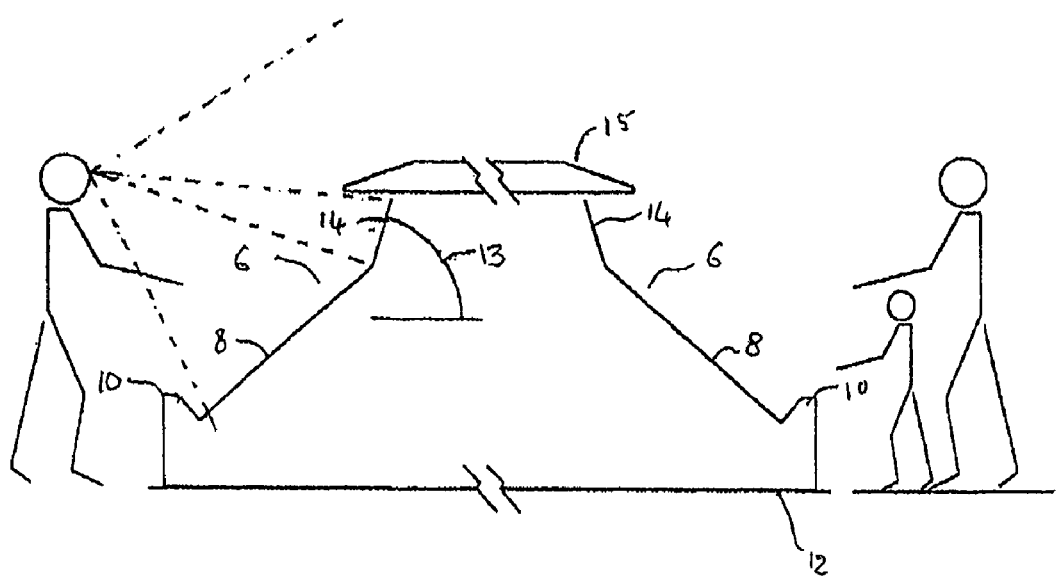
FIG. 2 is a side view in section of part of a second conveyor in accordance with second embodiment of the present invention.

In a second embodiment, shown in FIG. 2, the visual surface 14 is inclined at an angle 13 of around 65 to 80 degrees, preferably 73 degrees, to the horizontal when the slats 6 are incorporated into the conveyor housing 4.

The height of the visual surface 14 and the angle 13 of incline is chosen to provide optimum comfort for the eye of the user when looking at the surface 14, while waiting for the baggage to arrive via the retaining surface 8.

The conveyor housing 4 has a roof portion 15 that overhangs from the visual surface 14 when the slats 6 are incorporated. The overhang of the roof portion 15 reduces reflection from the visual surface 14 caused by overhead lighting in the building within which the conveyor is installed. The overhang also acts to deflect baggage thrown towards the visual surface 14 away from that surface and towards the baggage retaining surface 8, thereby reducing the risk of damage to the visual surface 14.

Each slat 6 is linked to a standard conveyor track system (not shown) built into the housing 4 to allow the slats 6 to move along the length of the conveyor housing 4.

One system of communication between the slats to provide advertising along the visual surface 14 of the conveyor 2 will now be described. It will, however, be appreciated that the communication system hereinbefore described is merely given as an example of how power and data information can be relayed across the conveyor system.

Figure 3:
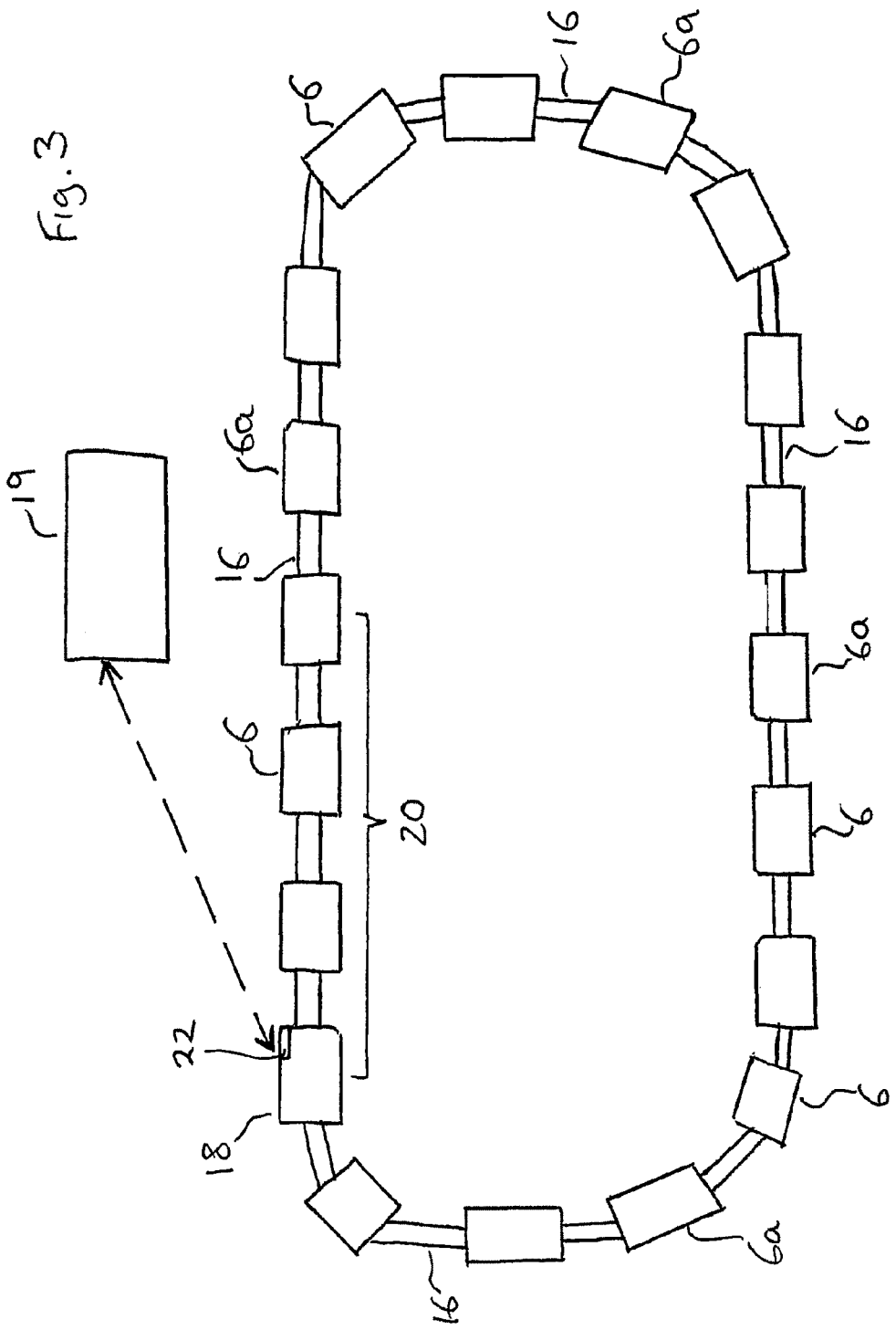
FIG. 3 is a plan schematic view showing the communication of slats of the conveyor of FIG. 1 or FIG. 2.
Figure 4:
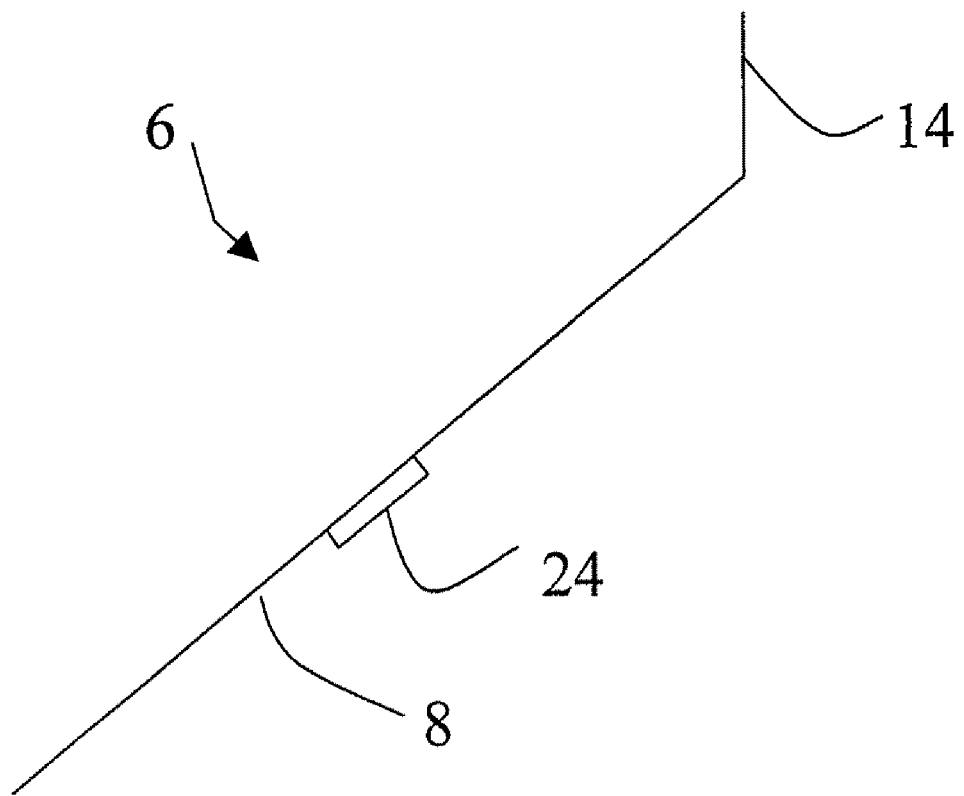
FIG. 4 is a partial, schematic view of a slat showing the relationship between the visual surface and a power source.

In the system communication shown in FIG. 3, the slats 6 extending along the sides 5 of the conveyor housing 4 are linked via a local area network (LAN) using known non-wireless techniques, such as for example, a shielded cable 16 carried on flexible loops (not shown) between the slats 6, or fibre optic cable technology. The cable 16 should be immune to cross-talk or corruption that may otherwise occur within the system.

One slat 18 is designated as a "leader". The entire conveyor system may comprise a number of slat series 20. Each series 20 may have its own leader slat 18.

Computer-generated data in the form of advertising or other indicia which is to be displayed through the slats 6 is communicated to the leader slat 18 via a central control 19 which may be remote from the conveyor system.

The data communicated to the leader slat 18 is further communicated to the other slats 6 through the LAN which may consist of, for example, a token-ring which has a built-in redundancy system to overcome any problems that may occur in the event of one or more slats 6 falling.

The leader slat 18 may include a docking/communication port 22 to be accessed to download new data from the central control 19 as and when required to be communicated across the LAN.

One slat 6a of each series 20, which may be the leader slat 18, incorporates a power source 24 such as a battery or power-booster to provide power across the LAN.

The battery or booster is attached to the back of the retaining surface 8 of the slat 6a where there is suitable free-space within the main housing 4 of the conveyor 2.

The power source may be derived from any known technology, such as for example, chemical, magnetic, photoelectric, bus-bar or brush contact technology. More than one slat 6 in a series 20 of slats may include a power source. Alternatively, each slat 6 of the entire LAN may have its own power source.

Each slat 6 may, alternatively include its own communication port to download data from the central control 19.

The above described embodiments have been given by way of example only, and the skilled reader will naturally appreciate that many variations could be made thereto without departing from the scope of the present invention.

The invention claimed is:

1. A conveyor having a plurality of slats for transferring articles around the conveyor, at least some of said slats having at least one visual surface through which computer-generated indicia is displayed, at least one said slat being in communication with at least one other said slat to communicate data between said communicating slats to control said computer-generated indicia displayed through each said communicating slat.

2. A conveyor according to claim 1, wherein said slats have a retaining surface for retaining said article thereon said slats being incorporated into said conveyor adjacent to each other such that said retaining surfaces and visual surfaces extend in continuity along at least part of a length of said conveyor.

3. A conveyor according to claim 2, wherein at least one said communicating slat incorporates a power source.

4. A conveyor according to claim 3, wherein the power source is located behind the retaining surface of the slat.

5. A conveyor according to claim 3, wherein said communicating slats additionally communicate with each other to transfer power from said power source to each said communicating slat.

6. A conveyor according to claim 1, wherein at least one slat comprises a communication port to receive data from a central control.

7. A claim according to claim 6, wherein the central control is remote from the conveyor.

8. A conveyor according to claim 1, wherein the slats are in communication with each other to transfer the data to each slat.

9. A conveyor according to claim 2, wherein said visual surface of each slat is disposed above and at an angle to said retaining surface such that said articles transferred around said conveyor will tend to lie on said retaining surface and not obscure said visual surface.

10. A conveyor according to claim 2, wherein said retaining surface is inclined relative to a horizontal plane.

11. A conveyor according to claim 1, comprising a roof portion that overhangs said visual surfaces for deflecting said articles away from said visual surfaces.

12. A conveyor according to claim 1, comprising cabling extending between said communicating slats for communicating said data therebetween via a local area network.

13. A conveyor according to claim 1, wherein a plurality of said slats receive said data from an external source, each of said receiving slats having an associated series of slats communicating therewith by cabling extending between said receiving slat and said associated series of slats via a local area network.

14. A conveyor comprising a plurality of slats that each comprise an article carrying portion and a visual surface, said plurality of slats comprising a first slat that comprises a communication port to receive data from a central control and being in communication to communicate said data from said first slat to control images displayed by said visual surfaces of said plurality of slats.

15. A conveyor according to claim 14, wherein said visual surface is disposed above and inclined with respect to said article carrying portion.

16. A conveyor according to claim 14, comprising a cable connected with said plurality of slats for communicating said data between said slats via a local area network.

17. A conveyor according to claim 14, wherein one of said slats is provided with a power source and said slats are in communication to transfer power from said power source to each slat.

18. A conveyor according to claim 14, comprising a roof portion that overhangs said display portions.

19. A baggage carousel comprising:
   a housing; and
   a conveyor comprising a plurality of slats movable along said housing for transporting baggage;
   said slats comprising series of slats that each comprise a baggage carrying surface and a visual surface, a first of said series of slats comprising a communication port for receiving data from a central control and said series of slats being connected by cabling by which said data is communicated from said first slat to said series of slats via a local area network for controlling indicia displayed through said visual surfaces;
   said visual surfaces being disposed above and inclined with respect to said baggage carrying surfaces; and
   said baggage carrying surfaces being inclined with respect to a horizontal plane.

\* \* \* \* \*